United States Patent
Ciaravino et al.

(10) Patent No.: US 9,976,464 B1
(45) Date of Patent: May 22, 2018

(54) REDUCTANT SPRAY AND EXHAUST GAS FLOW GUIDE AND DEFLECTOR

(71) Applicant: GM GLOBAL TECHNOLOGY OPERATIONS LLC, Detriot, MI (US)

(72) Inventors: Claudio Ciaravino, Turin (IT); Joshua Clifford Bedford, Farmington Hills, MI (US); Andrea Arnone, Piemonte (IT)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 15/346,225

(22) Filed: Nov. 8, 2016

(51) Int. Cl.
| | |
|---|---|
| *F01N 13/08* | (2010.01) |
| *F01N 3/20* | (2006.01) |
| *F01N 13/00* | (2010.01) |
| *F01N 11/00* | (2006.01) |
| *F01N 3/10* | (2006.01) |
| *F01N 3/021* | (2006.01) |
| *F01N 3/08* | (2006.01) |

(52) U.S. Cl.
CPC ......... *F01N 3/2066* (2013.01); *F01N 3/021* (2013.01); *F01N 3/0842* (2013.01); *F01N 3/103* (2013.01); *F01N 11/007* (2013.01); *F01N 13/0093* (2014.06); *F01N 2610/1453* (2013.01)

(58) Field of Classification Search
CPC ............... F01N 13/008; F01N 2240/20; F01N 2560/026; G01N 27/4077; G01N 33/0037
See application file for complete search history.

(56) References Cited

U.S. PATENT DOCUMENTS

| | | | | |
|---|---|---|---|---|
| 2016/0326931 | A1* | 11/2016 | Freeman | F01N 3/2066 |
| 2017/0284270 | A1* | 10/2017 | Ikeda | F01N 13/008 |

FOREIGN PATENT DOCUMENTS

| | | | | |
|---|---|---|---|---|
| DE | 102011086621 | * | 5/2013 | F01N 13/008 |

* cited by examiner

*Primary Examiner* — Jonathan Matthias
(74) *Attorney, Agent, or Firm* — Quinn IP Law

(57) ABSTRACT

An after-treatment (AT) system for an exhaust gas flow from an internal combustion engine includes first and second AT devices positioned in the exhaust gas flow. The AT system also includes an exhaust passage for carrying the flow of exhaust gas from the first AT device to the second AT device. The AT system additionally includes an injector configured to generate a reductant spray into the exhaust passage and a sensor positioned proximate the injector for detecting a concentration of a pollutant in the exhaust gas flow downstream of the first AT device. The AT system furthermore includes a deflector arranged between the injector and the sensor and configured to guide the flow of exhaust gas to the sensor to thereby concentrate the flow of exhaust gas at the sensor and direct the reductant spray away from the sensor to thereby minimize detection of the reductant by the sensor.

20 Claims, 4 Drawing Sheets

REDUCTANT SPRAY AND EXHAUST GAS FLOW GUIDE AND DEFLECTOR

INTRODUCTION

The present disclosure is drawn to a guide and deflector for a reductant spray and an exhaust gas flow in an exhaust gas after-treatment (AT) system employed by an internal combustion engine.

Various exhaust after-treatment (AT) devices, such as particulate filters and other devices, have been developed to effectively limit exhaust emissions from internal combustion engines. One of the exhaust after-treatment devices frequently used in a modern lean burn internal combustion engine, such as a compression-ignition or diesel type, is a selective catalytic reduction (SCR) catalyst.

The SCR is configured to convert nitrogen oxides ($NO_X$) into diatomic nitrogen ($N_2$) and water ($H_2O$) with the aid of the $NO_2$ generated by another exhaust after-treatment device, typically the diesel oxidation catalyst (DOC). For effective removal of $NO_X$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) into the exhaust gas flow, when the reductant is employed in diesel engines. Such a reductant may be an aqueous solution of urea that includes water and ammonia.

SUMMARY

An after-treatment (AT) system for a flow of exhaust gas of an internal combustion engine includes a first AT device and a second AT device in fluid communication with and positioned in the flow of exhaust gas downstream of the first AT device. The AT system also includes an exhaust passage configured to carry the flow of exhaust gas from the first AT device to the second AT device. The AT system additionally includes an injector configured to generate a spray of a reductant into the exhaust passage and a sensor positioned proximate the injector and configured to detect a concentration of a pollutant in the flow of exhaust gas downstream of the first AT device. The AT system furthermore includes a deflector arranged between the injector and the sensor and configured to guide the flow of exhaust gas to the sensor to thereby concentrate the flow of exhaust gas at the sensor and direct the spray of the reductant away from the sensor to thereby minimize detection of the reductant by the sensor.

The first AT device may be encased within a first housing, the second AT device may be encased within a second housing, and the exhaust passage may be configured as a transfer pipe between the first and second housings. Furthermore, the first housing, the second housing, and the transfer pipe may all be joined in a unitary assembly.

Each of the deflector, the injector, and the sensor may be arranged in the transfer pipe.

The deflector may be positioned in the transfer pipe to permit the injector to generate an unrestricted reductant spray cone having at least a 24 degree angle.

The deflector may be fixed to a structure of the transfer pipe.

The transfer pipe may be a cast component and the deflector may be cast into the transfer pipe.

The deflector may be characterized by a curved shape having a concave surface facing the injector and a convex surface facing the sensor.

The curved shape of the deflector may be characterized by a length equal to or greater than, i.e., at least coextensive with, a distance the sensor protrudes into the flow of exhaust gas within the transfer pipe.

As disclosed, the internal combustion engine may be a compression-ignition engine, the reductant may be a diesel-exhaust-fluid (DEF) having an aqueous solution of urea, and the pollutant may be nitrogen oxide ($NO_X$).

The first AT device may be either a diesel oxidation catalyst (DOC) or a lean $NO_X$ trap (LNT). The second AT device may be a dual-function substrate including a selective catalytic reduction (SCR) catalyst and a diesel particulate filter (DPF).

A vehicle employing the above-described AT system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
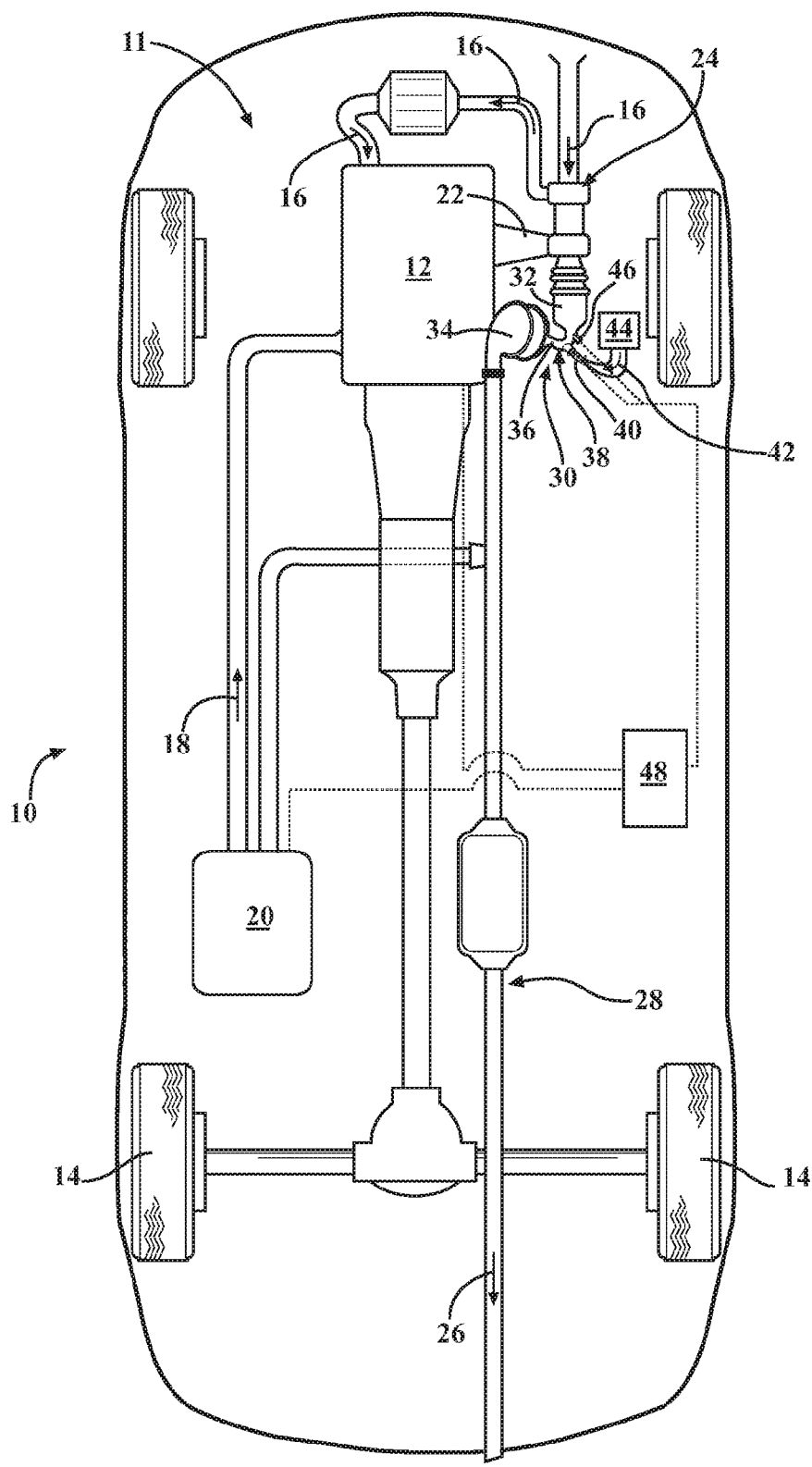
FIG. 1 is a schematic plan view of a vehicle having an internal combustion engine connected to an exhaust system having an after-treatment (AT) system with a number of AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by a flow of exhaust gas, specifically the exhaust gas flow 26 released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
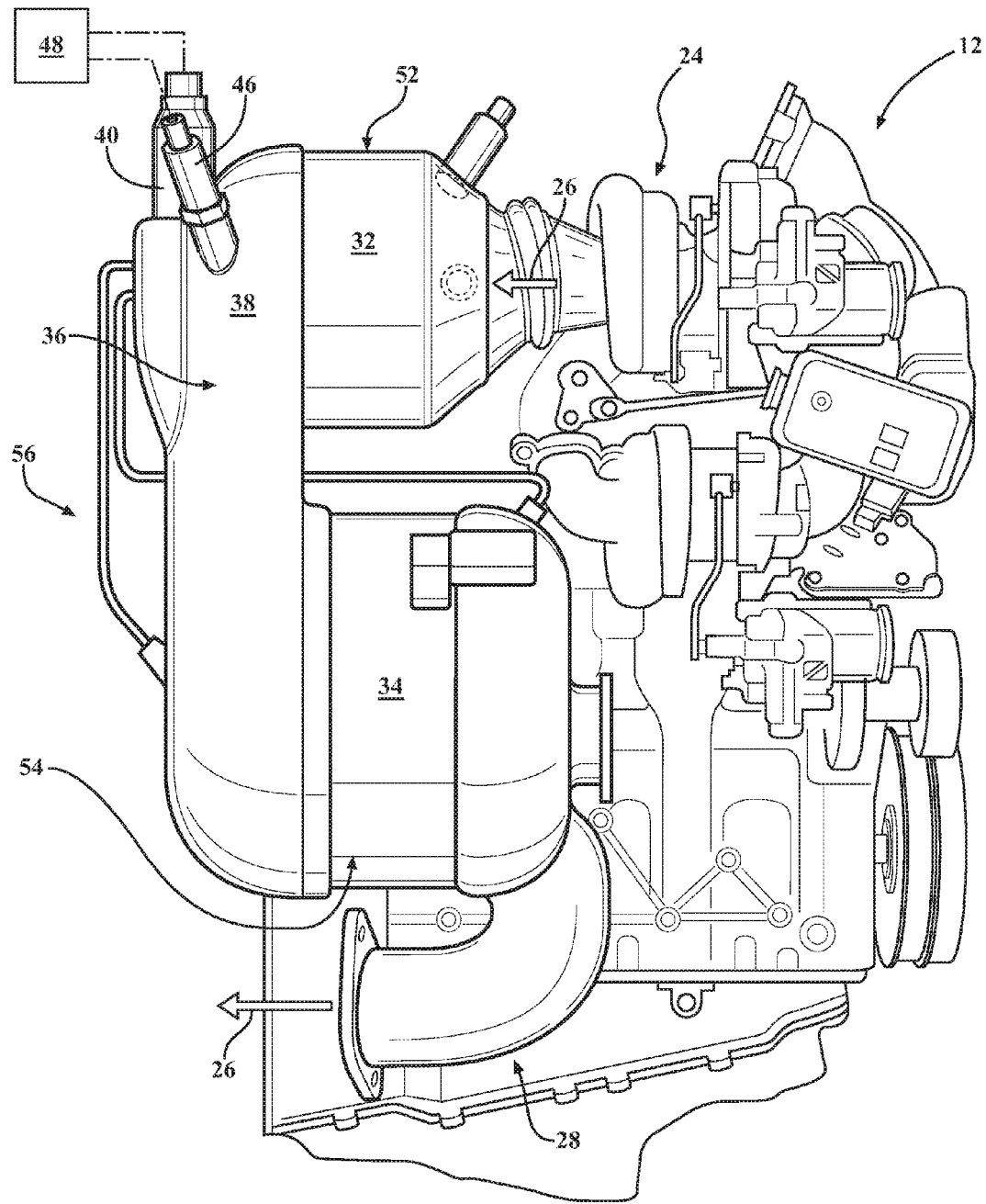
FIG. 2 is a schematic illustration of the internal combustion engine connected to the exhaust system with the after-treatment (AT) system shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas flow 26. As shown in FIGS. 1 and 2, the AT system 30 operates as part of the exhaust system 28. The AT system 30 includes a first AT device 32 close-coupled to the turbocharger 24 and a second AT device 34 positioned in the exhaust gas flow 26 downstream and close-coupled to the first AT device. As employed herein, the term "close-coupled" with respect to the arrangement of the first and second AT devices 32, 34 denotes each of the subject devices being in close proximity to each other and arranged inside an engine compartment 11 of the vehicle 10 for close proximity to the engine 12.

The close-coupled arrangement of the first and second AT devices 32, 34 reduces length of the exhaust passage (to be described in detail below) for carrying the exhaust gas flow 26 from the first AT device 32 to the second AT device 34. Consequently, such close-coupling of the first and second AT devices 32, 34 to the engine 12 provides a compact packaging arrangement that minimizes time for activation, i.e., light-off, of the AT system 30 in after-treatment of the exhaust gas flow 26 following a cold-start of the engine 12. As shown, the first AT device 32 may be a diesel oxidation catalyst (DOC) or a lean nitrogen oxide ($NO_X$) trap (LNT), while the second AT device 34 may be a dual-function substrate including a selective catalytic reduction (SCR) catalyst or an SCR on filter (SCRF) and a diesel particulate filter (DPF).

The primary function of the DOC is reduction of carbon monoxides (CO) and non-methane hydrocarbons (NMHC). When present, the DOC is additionally configured to generate nitrogen dioxide ($NO_2$), which may be used by the SCR arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas flow 26 prior to the gas reaching the DOC.

The primary function of the LNT is to reduce oxides of nitrogen or $NO_X$ that are emitted by the engine 12 in the exhaust gas flow 26 as a byproduct of the reaction of nitrogen and oxygen gases in the air following a combustion event. The LNT removes $NO_X$ molecules from the exhaust gas flow 26 by adsorption, i.e., trapping and storing them internally during operation of the engine 12, thus acting like a molecular sponge. Typically, the LNT includes a ceramic substrate structure with a catalyzed wash-coat, i.e., mixed with an active precious metal, that is applied to channels of the substrate.

The primary function of the SCR is to convert nitrogen oxides ($NO_X$) into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas flow 26.

The primary function of the DPF is to collect and dispose of particulate matter emitted by the engine 12. The DPF acts as a trap for removing the particulate matter, specifically, soot, from the exhaust flow 26. Similar to the DOC described above, the DPF may contain precious metals, such as platinum and/or palladium, which would function as a catalyst to accomplish the noted objective. When used with an SCRF, however, such precious metals in the DPF could be removed.

As shown, the DOC or the LNT first AT device 32 is positioned upstream of the second AT device 34 including the SCR and DPF. The AT system 30 also includes an exhaust passage 36 configured to carry the flow of exhaust gas 26 from the first AT device 32 to the second AT device 34. The exhaust passage 36 may be part of a transfer pipe 38 fluidly connecting the first and second AT devices 32, 34. As part of the AT system 30, an injector 40 is arranged downstream of the first AT device 32. The injector 40 is configured to generate a spray of a reductant 42 containing ammonia ($NH_3$), such as an aqueous solution of urea, a.k.a., diesel-exhaust-fluid (DEF), into the exhaust passage 36. As shown in FIG. 1, the injector 40 may receive the reductant 42 from a refillable reservoir 44. Also part of the AT system 30, a sensor 46 is positioned proximate the injector 40. The sensor 46 is configured to detect a concentration of a pollutant, such as $NO_X$, and also of oxygen ($O_2$) in the flow of exhaust gas 26 downstream of the first AT device 32.

The AT system 30 also includes a controller 48. The controller 48 may be a stand-alone unit, or be part of an electronic control unit (ECU) that regulates the operation of engine 12. The controller 48 is arranged on the vehicle 10 and includes a processor and a readily accessible non-transitory memory. Instructions for controlling operation of the AT system 30 are programmed or recorded in the memory of the controller 48 and the processor is configured to execute the instructions from the memory during operation of the vehicle 10. The controller 48 is generally programmed to regulate the injector 40 for introducing the reductant 42 into the exhaust passage 36 during operation of the engine 12. The controller 48 is also in communication with the sensor 46 for regulating the injector 40 in response to the detected concentration of the particular pollutant, as well as for regulation of other engine systems.

Figure 3:
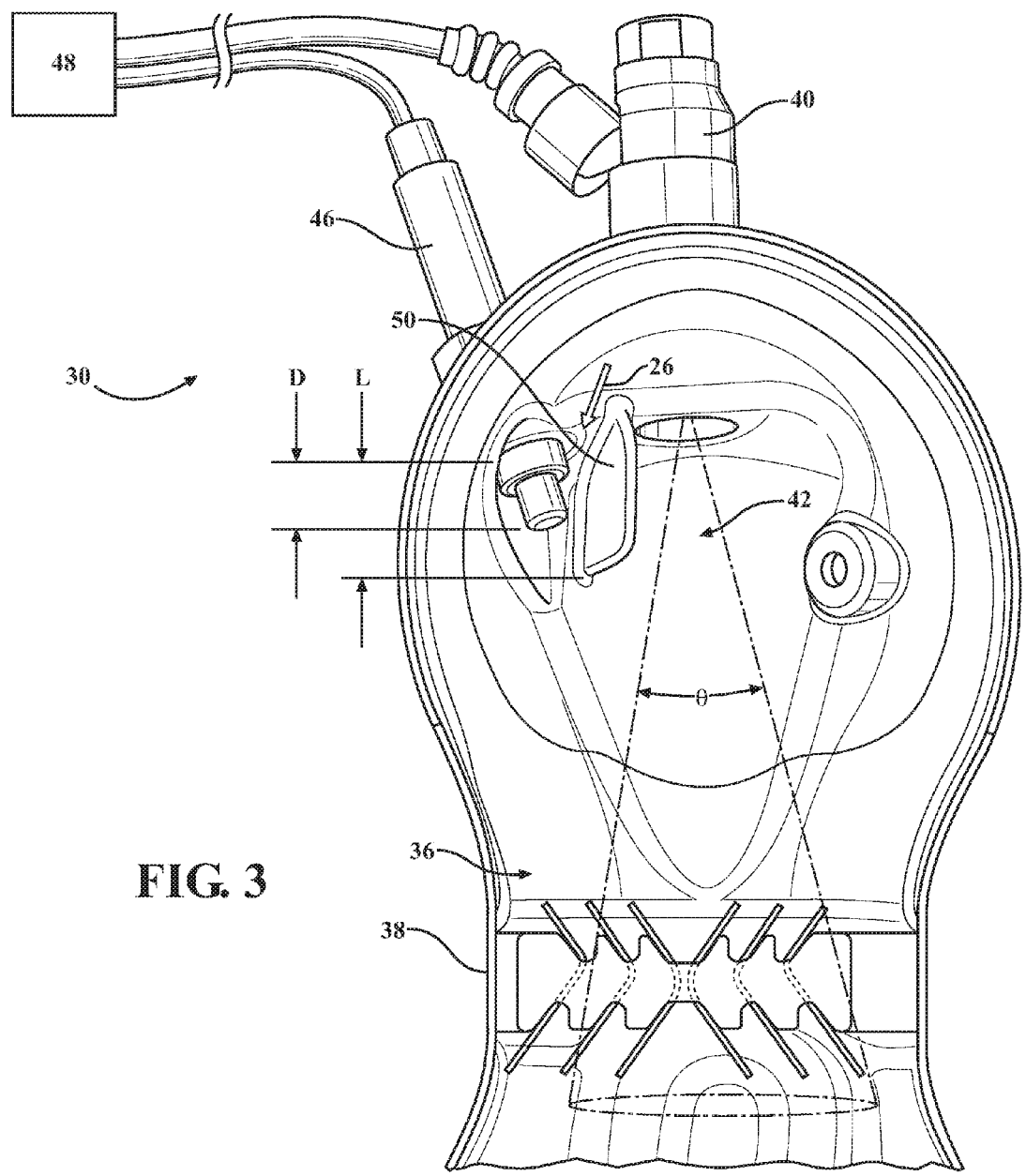
FIG. 3 is a schematic perspective partial cut-away view of the AT system shown in FIG. 1, illustrating a reductant injector, a pollutant concentration sensor, and an embodiment of a deflector for guiding a flow of exhaust gas to the sensor and directing a spray of the reductant away from the sensor.
Figure 4:
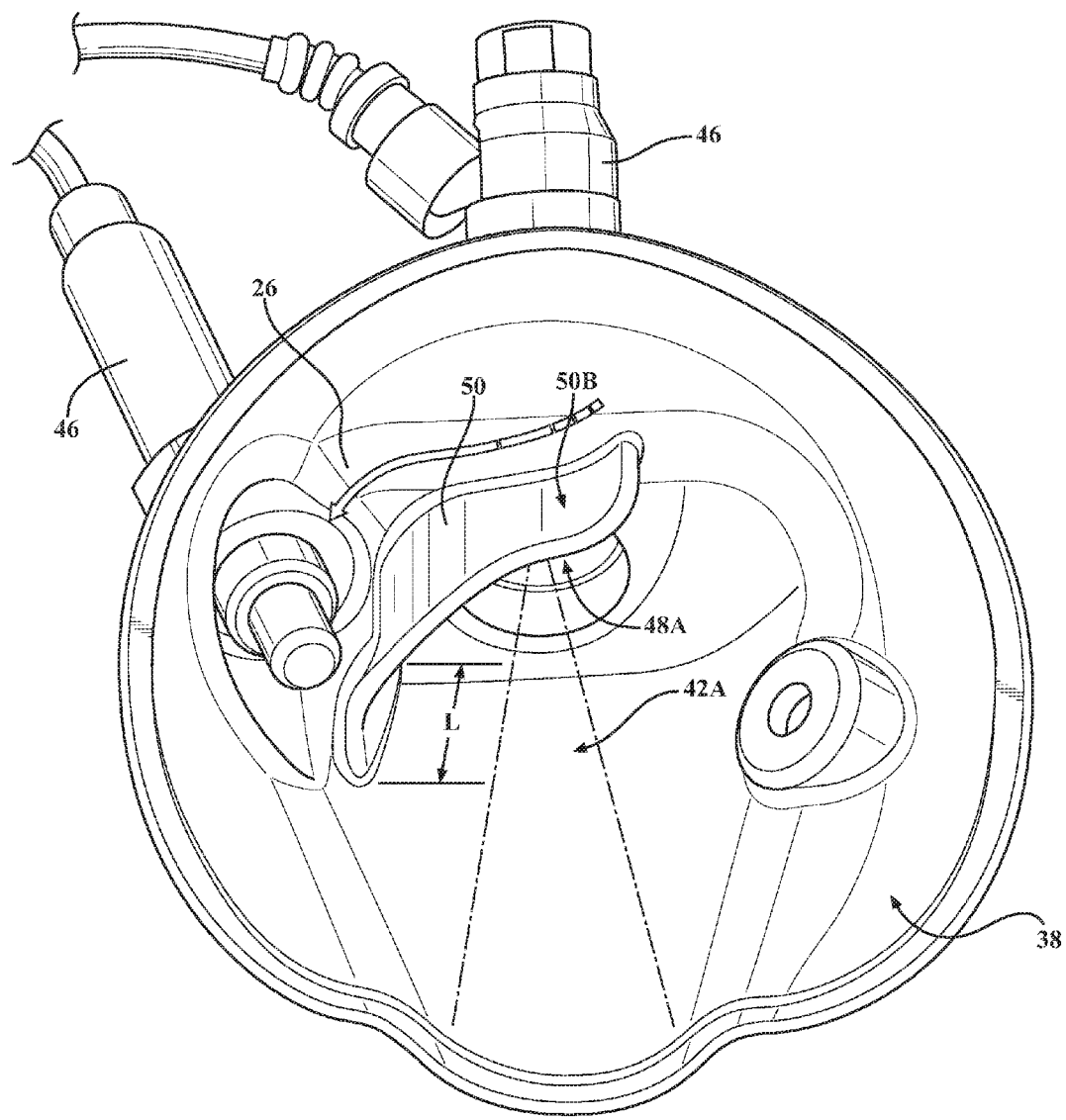
FIG. 4 is a schematic perspective partial cut-away view of the AT system shown in FIG. 1, illustrating another embodiment of the deflector.

As shown in FIG. 3, a deflector 50 is arranged in the exhaust passage 36 between the injector 40 and the sensor 46. The deflector 50 is configured to guide the flow of exhaust gas 26 to the sensor 46, to thereby concentrate the flow of exhaust gas at the sensor. A stratified flow of the exhaust gas flow 26 may thus cause a misreading by the sensor 46. Accordingly, such concentration of the flow of exhaust gas 26 at the sensor 46 is intended to improve a sampling quality of the exhaust gas flowing through the exhaust passage 36, i.e., ensure quality sensor reading of $NO_X$ in the flow of the exhaust gas 26. The deflector 50 is also configured to direct or deflect the spray of the reductant 42 away from the sensor 46, to thereby minimize detection of the reductant by the sensor.

The sensor 46 configured to detect $NO_X$ may be cross-sensitive to ammonia, accordingly, a presence of ammonia at or around the sensor may be misread as a higher concentration of $NO_X$. A swirling flow of the exhaust gas flow 26 containing ammonia may thus cause a misreading by the sensor 46. Such a misreading of $NO_X$ may result in improper closed-loop control of the engine 10 by the controller 48 using the detected $NO_X$ concentration data. Furthermore, such a misreading of $NO_X$ concentration may result in the controller 48 erroneously reporting that the AT system 30 is insufficiently effective in removing $NO_X$ from the exhaust gas flow 26.

With resumed reference to FIG. 2, the first AT device 32 may be encased within a first housing 52, while the second AT device 34 may be encased within a second housing 54. The transfer pipe 38 is arranged between and connects the first and second housings 52, 54. As shown, the first housing 52, the second housing 54, and the transfer pipe 38 may be joined in a unitary assembly 56. In such a construction of the AT system 30, each of the injector 40, the sensor 46, and the deflector 50, may be arranged in the transfer pipe 38. The deflector 50 may be specifically positioned in the transfer pipe 38 to permit the injector 40 to generate an unrestricted reductant spray cone 42A having at least a 24 degree angle θ.

As shown in FIG. 3, the deflector 50 may be fixed to a structure of the transfer pipe 38. Specifically, the transfer pipe 38 may be a cast component, for example from iron or steel, welded to the first and second housings 52, 54. In such an embodiment, the deflector 50 may also be a cast feature incorporated into, i.e., formed with, the transfer pipe 38. Other manufacturing methods for generating the desired shape of the transfer pipe 38 along with the deflector 50, for example via machining, may also be employed. As shown in FIG., 4, the deflector 50 may be characterized by a curved shape having a concave surface 48A facing the injector 40 and a convex surface 50B facing the sensor 46. The curved shape of the deflector 50 may be additionally characterized by a length L that is equal to or greater than, i.e., at least coextensive with, a distance D that the sensor 46 protrudes into the flow of exhaust gas 26 within the transfer pipe 38.

Overall, the deflector 50 permits a compact, close-coupled package of the first and second AT devices 32, 34 to the engine 12 without loss of a quality reading of concentration of the particular pollutant in the exhaust gas flow 26 at the sensor 46. As a result, such effective close-coupled packaging of the first and second AT devices 32, 34 to the engine 12 facilitates effective cold-start operation of the AT system 30, i.e., quicker light-off of the respective AT devices.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An after-treatment (AT) system for a flow of exhaust gas from an internal combustion engine, the AT system comprising:
    a first AT device;
    a second AT device positioned in the flow of exhaust gas downstream of the first AT device;
    an exhaust passage configured to carry the flow of exhaust gas from the first AT device to the second AT device;
    an injector configured to generate a spray of a reductant into the exhaust passage;
    a sensor positioned proximate the injector and configured to detect a concentration of a pollutant in the flow of exhaust gas downstream of the first AT device; and
    a deflector arranged between the injector and the sensor and configured to guide the flow of exhaust gas to the sensor to thereby concentrate the flow of exhaust gas at the sensor and direct the spray of the reductant away from the sensor to thereby minimize detection of the reductant by the sensor.

2. The AT system of claim 1, wherein the first AT device is encased within a first housing, the second AT device is encased within a second housing, the exhaust passage is configured as a transfer pipe between the first and second housings, and wherein the first housing, the second housing, and the transfer pipe are joined in a unitary assembly.

3. The AT system of claim 2, wherein each of the deflector, the injector, and the sensor is arranged in the transfer pipe.

4. The AT system of claim 3, wherein the deflector is positioned in the transfer pipe to permit the injector to generate an unrestricted reductant spray cone having at least a 24 degree angle.

5. The AT system of claim 3, wherein the deflector is fixed to a structure of the transfer pipe.

6. The AT system of claim 5, wherein the transfer pipe is a cast component and the deflector is cast into the transfer pipe.

7. The AT system of claim 1, wherein the deflector is characterized by a curved shape having a concave surface facing the injector and a convex surface facing the sensor.

8. The AT system of claim 7, wherein the curved shape of the deflector is characterized by a length equal to or greater than a distance the sensor protrudes into the flow of exhaust gas within the transfer pipe.

9. The AT system of claim 1, wherein:
    the internal combustion engine is a compression-ignition engine;
    the reductant is a diesel-exhaust-fluid (DEF) having an aqueous solution of urea; and
    the pollutant is nitrogen oxide ($NO_X$).

10. The AT system of claim 9, wherein:
    the first AT device is one of a diesel oxidation catalyst (DOC) and a lean $NO_X$ trap (LNT); and
    the second AT device is a dual-function substrate including a selective catalytic reduction (SCR) catalyst and a diesel particulate filter (DPF).

11. A vehicle comprising:
    an internal combustion engine configured to generate a flow of exhaust gas as a byproduct of generating power; and
    an exhaust system connected to the engine and having an after-treatment (AT) system for the flow of exhaust gas, the AT system including:
    a first AT device;
    a second AT device positioned in the flow of exhaust gas downstream of the first AT device;

an exhaust passage configured to carry the flow of exhaust gas from the first AT device to the second AT device; and an injector configured to generate a spray of a reductant into the exhaust passage;

a sensor positioned proximate the injector and configured to detect a concentration of a pollutant in the flow of exhaust gas downstream of the first AT device; and a deflector arranged between the injector and the sensor and configured to guide the flow of exhaust gas to the sensor to thereby concentrate the flow of exhaust gas at the sensor and direct the spray of the reductant away from the sensor to thereby minimize detection of the reductant by the sensor.

12. The vehicle of claim 11, wherein the first AT device is encased within a first housing, the second AT device is encased within a second housing, the exhaust passage is configured as a transfer pipe between the first and second housings, and wherein the first housing, the second housing, and the transfer pipe are joined in a unitary assembly.

13. The vehicle of claim 12, wherein each of the deflector, the injector, and the sensor is arranged in the transfer pipe.

14. The vehicle of claim 13, wherein the deflector is positioned in the transfer pipe to permit the injector to generate an unrestricted reductant spray cone having at least a 24 degree angle.

15. The vehicle of claim 13, wherein the deflector is fixed to a structure of the transfer pipe.

16. The vehicle of claim 15, wherein the transfer pipe is a cast component and the deflector is cast into the transfer pipe.

17. The vehicle of claim 11, wherein the deflector is characterized by a curved shape having a concave surface facing the injector and a convex surface facing the sensor.

18. The vehicle of claim 17, wherein the curved shape of the deflector is characterized by a length equal to or greater than a distance the sensor protrudes into the flow of exhaust gas within the transfer pipe.

19. The vehicle of claim 11, wherein:

the internal combustion engine is a compression-ignition engine;

the reductant is a diesel-exhaust-fluid (DEF) having an aqueous solution of urea; and the pollutant is nitrogen oxide ($NO_X$).

20. The vehicle of claim 19, wherein:

the first AT device is one of a diesel oxidation catalyst (DOC) and a lean $NO_X$ trap (LNT); and the second AT device is a dual-function substrate including a selective catalytic reduction (SCR) catalyst and a diesel particulate filter (DPF).

* * * * *